June 1, 1954 O. SÜS 2,680,062
PROCESS FOR THE PRODUCTION OF AZO DYESTUFF IMAGES
Filed July 18, 1950
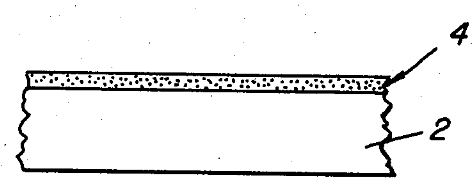
Fig. I
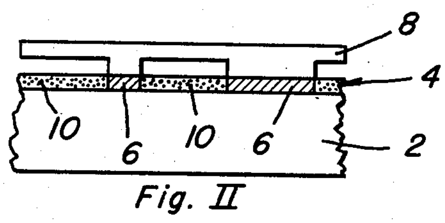
Fig. II
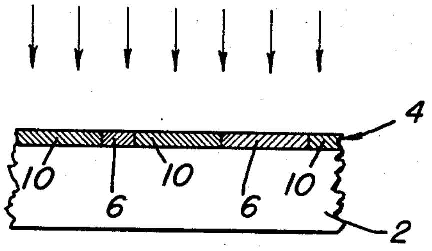
Fig. III
INVENTOR
OSKAR SÜS
BY J. Russell Juten
ATTORNEY Patented June 1, 1954 2,680,062

UNITED STATES PATENT OFFICE 2,680,062

PROCESS FOR THE PRODUCTION OF AZO DYESTUFF IMAGES

Oskar Süs, Wiesbaden-Biebrich, Germany, assignor, by mesne assignments, to Keuffel & Esser Co., Hoboken, N. J., a corporation of New Jersey Application July 18, 1950, Serial No. 174,459

Claims priority, application Germany July 23, 1949

6 Claims. (Cl. 41—41)

The present invention relates to the production of images on photo-sensitive surfaces sensitized with diazo compounds. More specifically it relates to the production of images on surfaces sensitized with light-sensitive diazo compounds capable of coupling with azo components to form azo dyestuffs under the influence of heat.

U. S. Patent 2,217,189 describes light-sensitive materials sensitized with a light sensitive aromatic diazo-N-sulfonate (preferably one of the amino diazo compounds) and a component suitable for coupling with the diazo compound contained in the diazo sulfonate to form an azo dyestuff. Exposure to light under a pattern destroys the diazo compound in the light struck areas. The image is developed by application of heat, which disengages the diazo compound contained in the undecomposed diazo sulfonate and causes the diazo compound to couple with the azo component and form a positive azo dye image in all areas not struck by the light. With the aid of a light-sensitive material of this type, copies of light transmitting originals can be produced without the necessity of applying fluid or gaseous developers.

Improvements in light-sensitive materials of the type described in U. S. Patent 2,217,189 as to their storing capacity and light-sensitivity are disclosed in U. S. Patent 2,429,249 and the pending U. S. patent application Serial No. 110,025, filed on August 12, 1949 in the name of Oskar Süs.

The principal object of the present invention is to provide a method for forming an image in material of the type described by selectively heating only predetermined areas of the material.

This and other objects of the invention and the method of their attainment will be more fully understood by the following description taken in connection with the accompanying drawing in which:

Fig. I is a view in diagrammatic elevation showing a photo-sensitive material of the type described.

Fig. II is a view in diagrammatic elevation showing the selective application of heat to predetermined areas of the material of Fig. I to develop an image.

Fig. III is a view in diagrammatic elevation showing the exposure of the material of Fig. II to light to decompose the diazo compound in background areas and thereby fix the image.

In Fig. I, the base material 2 is provided with a photosensitive surface 4 formed by sensitizing the base material 2 with a light sensitive aromatic diazo-N-sulfonate (preferably one of the amino diazo compounds) and a component which will couple therewith upon heating to form an azo dye-stuff. This second component is commonly known in the art as an azo component. In general the light sensitive diazo sulfonates and coupling components disclosed in Patent Numbers 2,217,189 and 2,429,249 and the pending U. S. patent application Serial No. 110,025 filed on August 12, 1949 may be used in sensitizing the base material for the present invention. Additions as described in this prior art may also be used. Aromatic diazo-N-sulfonates of p-diphenylenediamines are particularly suitable for use as the diazo compound.

In Fig. II, heat is applied to certain areas 6 of the photosensitive surface 4 on the base material 2, which causes the diazo compound disengaged from the diazo sulfonate to react with the coupling component in the areas 6 to form an azo dye image. For purposes of illustration, the heat is shown being applied by means of a metal plate 8 which is brought into intimate contact with the photosensitive surface 4 in certain areas 6. Preferably the surface should be heated to temperatures above 100° C. This method of heating is given by way of illustration but it should be realized that the heating of certain selected areas of the surface may be accomplished in any convenient manner. For example an electric current or an electric charge may be used to heat the surface.

The coupling reaction would gradually also take place over a period of time in the unheated areas 10 of the photo-sensitive surface 4. In order to prevent this the surface 4 is exposed to light as shown in Fig. III. This decomposes the uncoupled diazo compound in the areas 10 which were not subjected to heating. Thus the formation of a dye in the background areas 10 is prevented so that in effect the image is fixed.

The image produced may be made up of letters and figures, drawings, the trace of the moving indicator of a recording instrument or writing or drawing motions induced by long distance transmission. The heat of the electric sparks flashing across between the poles of a high tension apparatus may be used for developing an image for picking up wireless messages.

An image may be produced in this manner on transparent or translucent material so that copies can be readily produced therefrom, as for example by the diazo ammonia process.

The following examples are inserted for purposes of illustration of the present invention.

(1) A photo- and heat-sensitive paper is produced by treating the surface of paper with a solution which has been made by dissolving in 50 ccm. of water 0.4 g. of phloroglucinol,
1.5 g. of thiourea,
0.5 g. of zinc acetate
0.2 g. of sodium sulfite (anhydrous), and
1.5 g. of 1-methoxynaphthalene-4-sulfonic acid sodium salt, and subsequently adding to the solution
1.1 g. of the sulfonate of the diazo compound of 1-N,N-diethylamino-4-amino-3-ethoxybenzene.

The paper which has been photo-sensitized by means of this preparation and dried in the usual manner is placed on a special typewriter. The platen of this typewriter may be provided with an electric heating device and the type caused to come into a close contact with the heat-sensitive layer to heat selected areas of the sensitized surface. The type may also be heated directly to accomplish the same purpose. Violet-blue images of the letters struck by the operator are produced on a yellow background. The background fades perfectly on exposure to light to fix the image. In the same manner copies of cliches and matrixes can be produced if instead of the type of the typewriter heated metallic reliefs are caused to come into close contact with the coated paper surface.

Instead of the above described sulfonate other aromatic diazo-N-sulfonates of N,N-dialkyl-p-phenylenediamines can be used. Those substituted by an alkoxy group in ortho position to the diazo group are particularly suitable. The following compounds are given as examples:

(1) Sulfonate of the diazo compound of 1-N,N - diethylamino - 4 - amino - 3,5 - diethoxybenzene,
Sulfonate of the diazo compound of 1-N,N - dipropylamino - 4 - amino - 3 - ethoxybenzene,
Sulfonate of the diazo compound of 1-N,N - diethylamino - 4 - amino - 3 - isopropoxybenzene.

(2) Transparent paper is coated with a solution of 0.4 g. of the sulfonate of 1-diazo-2,4,6-triethoxybenzene
0.08 g. of sodium sulfite (anhydrous),
0.3 g. of tartaric acid,
0.6 g. of thiourea, and
0.16 g. of acetyl acetic acid anilide in 10 ccm. of water.

Images of characters or prints are produced on the sensitized paper as described in Example 1. After sufficient exposure to light the images obtained appear in a pale yellow shade on a light background. The copies which are thus produced are suitable for use as intermediate masters and any number of prints, such as photographic copies can be made from them.

The sulfonate of 1-diazo-2,4,6-triethoxybenzene can be replaced by the sulfonate of 1-diazo-2,4,6-trimethoxybenzene.

(3) A strip of paper photo-sensitized as described in Example 1 is slowly passed between two electrodes connected to a high-tension source. One of the electrodes is shaped like a needle. The sparks flashing across appear in well-defined outlines as dots and lines in blue-violet color on the coated surface of the paper.

(4) In a recording apparatus, such as a pressure or temperature indicator for steam pumps, the writing means as used in practice are replaced by an electrically heated copper wire ending in a spindle-shaped point. Paper coated as indicated in Example 1 is fixed to the slowly moving drum disc of the recording apparatus which moves past the heated needle held in contact with the paper. A blue line is produced on a yellow background which indicates the variation of the property which was intended to be recorded. The paper is then exposed to light which makes the background white.

The above examples are intended to illustrate various materials suitable for use in the process and various methods for selectively heating only predetermined areas of these materials to form an image. The invention is not intended to be limited to the specific examples given.

Thus having fully described my present invention, I claim:

1. The method for producing azo dyestuff images on material sensitized with a light sensitive aromatic diazo-N-sulfonate of an N,N-dialkyl-p-phenylenediamine substituted by an alkoxy group in the ortho position to the diazo group and a component capable of coupling with the diazo compound contained therein to form an azo dye comprising the steps of selectively heating predetermined portions of the undecomposed sensitized area of the material to above 100° C. to form an image and subsequently exposing the material to strong actinic light to decompose the light sensitive diazo-N-sulfonate.

2. The method for producing azo dyestuff images on material sensitized with the sulfonate of the diazo compound of 1-N,N-diethylamino-4-amino-3-ethoxybenzene and a component capable of coupling with the diazo compound contained therein to form an azo dye comprising the step of selectively heating predetermined portions of the undecomposed sensitized area of the material to a temperature above 100° C. to form an image and subsequently exposing the material to strong actinic light to decompose the light sensitive diazo-N-sulfonate.

3. The method for producing azo dyestuff images on material sensitized with the sulfonate of the diazo compound of 1-N,N-diethylamino-4-amino-3,5 diethoxybenzene and a component capable of coupling with the diazo compound contained therein to form an azo dye comprising the step of selectively heating predetermined portions of the undecomposed sensitized area of the material to a temperature above 100° C. to form an image and subsequently exposing the material to strong actinic light to decompose the light sensitive diazo-N-sulfonate.

4. The method for producing azo dyestuff images on material sensitized with the sulfonate of the diazo compound of 1-N,N-dipropylamino-4-amino-3-ethoxybenzene and a component capable of coupling with the diazo compound contained therein to form an azo dye comprising the step of selectively heating predetermined portions of the undecomposed sensitized area of the material to a temperature above 100° C. to form an image and subsequently exposing the material to strong actinic light to decompose the light sensitive diazo-N-sulfonate.

5. The method for producing azo dyestuff images on material sensitized with the sulfonate of the diazo compound of 1-N,N-diethylamino- 4-amino-3-isopropoxybenzene and a component capable of coupling with the diazo compound contained therein to form an azo dye comprising the step of selectively heating predetermined portions of the undecomposed sensitized area of the material to a temperature above 100° C. to form an image and subsequently exposing the material to strong actinic light to decompose the light sensitive diazo-N-sulfonate.

6. The method for producing azo dyestuff images on material sensitized with the sulfonate of 1-diazo-2,4,6-triethoxybenzene and a component capable of coupling with the diazo compound contained therein to form an azo dye comprising the step of heating predetermined portions of the undecomposed sensitized area of the material to a temperature above 100° C. to form an image and subsequently exposing the material to strong actinic light to decompose the light sensitive diazo-N-sulfonate.

References Cited in the file of this patent

UNITED STATES PATENTS

| Number | Name | Date |
|---|---|---|
| 1,821,281 | Van der Grinten | Sept. 1, 1931 |
| 1,880,449 | Hickman | Oct. 4, 1932 |
| 2,217,189 | Sus | Oct. 8, 1940 |
| 2,306,471 | Solomon | Dec. 29, 1942 |

FOREIGN PATENTS

| Number | Country | Date |
|---|---|---|
| 544,702 | Great Britain | Apr. 24, 1942 |